United States Patent
Greenwood et al.

(10) Patent No.: US 9,641,464 B2
(45) Date of Patent: May 2, 2017

(54) FIFO BUFFER SYSTEM PROVIDING SAME CLOCK CYCLE RESPONSE TO POP COMMANDS

(75) Inventors: Robert T. Greenwood, Austin, TX (US); Robert Bahary, Arlington Heights, IL (US)

(73) Assignee: NXP USA, Inc., Austin, TX (US)

( * ) Notice: Subject to any disclaimer, the term of this patent is extended or adjusted under 35 U.S.C. 154(b) by 1363 days.

(21) Appl. No.: 13/459,841

(22) Filed: Apr. 30, 2012

(65) Prior Publication Data
US 2013/0290646 A1    Oct. 31, 2013

(51) Int. Cl.
G06F 12/00 (2006.01)
H04L 12/861 (2013.01)

(52) U.S. Cl.
CPC ................... H04L 49/90 (2013.01)

(58) Field of Classification Search
CPC ..... G06F 5/06; G06F 5/10; G06F 5/16; G11C 7/10; G11C 8/04
See application file for complete search history.

(56) References Cited

U.S. PATENT DOCUMENTS

| | | | | |
|---|---|---|---|---|
| 4,433,394 A | * | 2/1984 | Torii et al. | 365/189.05 |
| 5,261,064 A | * | 11/1993 | Wyland | G06F 5/10 365/189.04 |
| 5,371,877 A | * | 12/1994 | Drako | G06F 5/16 711/109 |
| 5,416,749 A | * | 5/1995 | Lai | 365/240 |
| 5,600,815 A | * | 2/1997 | Lin et al. | 711/109 |
| 5,663,910 A | * | 9/1997 | Ko et al. | 365/189.05 |
| 5,699,530 A | * | 12/1997 | Rust et al. | 711/150 |
| 6,026,473 A | * | 2/2000 | Cross et al. | 711/157 |
| 6,067,267 A | * | 5/2000 | Lo | 365/221 |
| 6,266,746 B1 | * | 7/2001 | Ando | 711/154 |
| 7,149,139 B1 | * | 12/2006 | Rosen | G06F 5/16 365/189.04 |
| 7,673,095 B2 | * | 3/2010 | Artieri | 711/109 |
| 2005/0091465 A1 | * | 4/2005 | Andreev et al. | 711/168 |
| 2007/0214335 A1 | * | 9/2007 | Bellows | G11C 7/1012 711/167 |

* cited by examiner

*Primary Examiner* — Charles Rones
*Assistant Examiner* — Nanci Wong

(57) ABSTRACT

A first-in first-out (FIFO) buffer system includes FIFO control logic and first and second storage partitions. Each storage partition includes a corresponding single-port memory bank and a prefetch buffer. The FIFO control logic alternates processing of PUSH commands between the first and second storage partitions. Additionally, the FIFO control logic anticipates POP commands based on the FIFO order and the alternating PUSH arrangement by initiating prefetches of data so that data to be accessed by a POP command is available at either the prefetch buffer (if the prefetch has completed) or the output of the single-port memory bank (if the prefetch has not yet completed) of the corresponding storage partition at the time the POP command is received, thereby enabling the output of the data for the POP command in the same clock cycle in which the POP command is received.

16 Claims, 6 Drawing Sheets

FIFO BUFFER SYSTEM PROVIDING SAME CLOCK CYCLE RESPONSE TO POP COMMANDS

FIELD OF THE DISCLOSURE

This disclosure generally relates to a system and method for buffering data in a first-in first-out (FIFO) buffer system.

BACKGROUND

A first-in first-out (FIFO) buffer system can be implemented using single-port memory or two-port (or dual-port) memory. While a two-port memory allows multiple reads or writes to occur concurrently, it may be impractical to implement two-port memory due to its complexity or for other reasons. In situations whereby implementation of a two-port memory is difficult, designers have implemented single-port memory in a manner that mimics the behavior of a two-port memory by clocking the single-port memory at twice the frequency of a FIFO interface associated with the single-port memory. Conventional FIFO buffer systems, whether using two-port memory or over-clocked single-port memory, typically are subject to a delay of at least one clock cycle from when a read address is clocked in a memory to when the data is provided out of the memory, thereby inhibiting the throughput of the FIFO buffer.

BRIEF DESCRIPTION OF THE DRAWINGS

The present disclosure may be better understood, and its numerous features and advantages made apparent to those skilled in the art by referencing the accompanying drawings.

DETAILED DESCRIPTION

FIGS. 1-6 illustrate embodiments of a FIFO buffer system employing two single-port memory banks in a manner that emulates a FIFO buffer system employing a two-port memory (that is, permits a concurrent read access and write access) without incurring the delay of at least one clock cycle typically found in conventional two-port FIFO buffers. The FIFO buffer system includes FIFO control logic and two storage partitions clocked by the same clock signal (or clocked at the same frequency). Each storage partition includes a corresponding one of the two single-port memory banks and a corresponding prefetch buffer. The FIFO control logic operates to alternate write accesses between the two storage partitions, which causes corresponding data reads to also alternate between the two storage partitions. The FIFO control logic anticipates the next read access to a storage partition based on the FIFO order and based on the alternating nature of the write accesses and initiates a prefetch of the data for the next read access to the storage partition so that the data for the next read access is available either at the prefetch buffer (if the prefetch completes before the next read access is received) or at the output of the single-port memory bank (if the prefetch has not completed before the next read access is received). This prefetching of data in anticipation of the next read access permits the FIFO buffer system to access and output the data for a read access in the same clock cycle of the clock signal in which the FIFO buffer system receives the read access, thereby avoiding the read access latency of one clock cycle or more typically found in conventional FIFO buffers.

Figure 1:
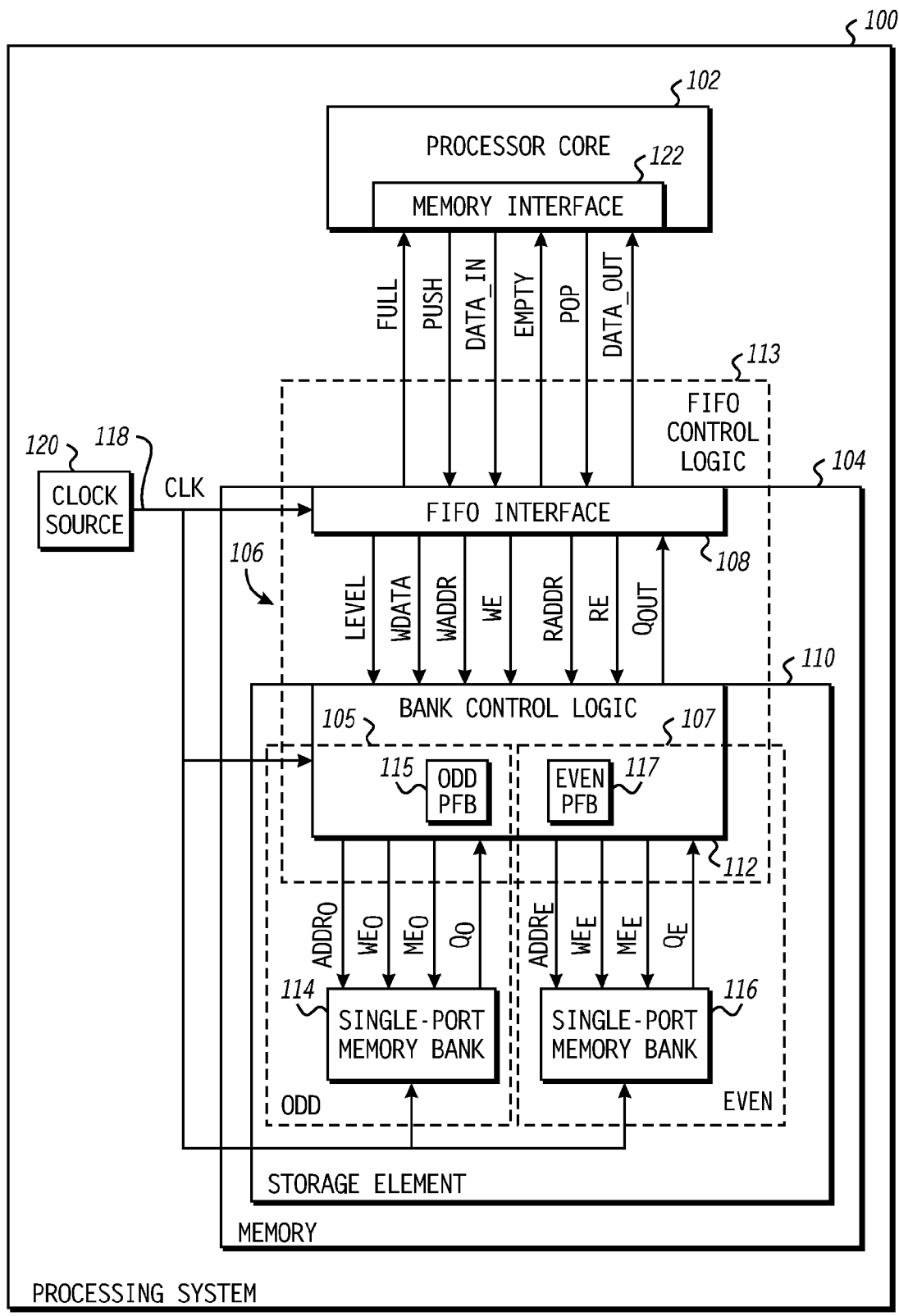
FIG. 1 illustrates a processing system having a FIFO buffer system in accordance with at least one embodiment of the present disclosure.

FIG. 1 depicts a processing system 100 including a processor core 102 and a memory 104, the memory 104 including a FIFO buffer system 106 in accordance with at least one embodiment of the present disclosure. The memory 104 can be implemented as, for example, an integrated circuit device packaged together with, or separate from, the processor core 102. The FIFO buffer system 106 includes a FIFO interface 108 and a storage element 110 (e.g., dynamic random access memory (DRAM), static random access memory (SRAM), flash memory, a register file, a cache, etc.). In an embodiment, the FIFO interface 108 can be implemented in circuitry that is separate from the circuitry that includes the memory 104, e.g., in a dynamic memory access (DMA) controller. The storage element 110 includes bank control logic 112 and two single-port memory banks 114 and 116. The bank control logic 112 is associated with two prefetch buffers 115 and 117, wherein the prefetch buffer 115 is coupled to the memory bank 114 and the prefetch buffer 117 is coupled to the memory bank 116. In at least one embodiment, portions of the storage element 110 are organized as two storage partitions 105 and 107, whereby the storage partition 105 contains the single-port memory bank 114 and the prefetch buffer 115 and the storage partition 107 contains the single-port memory bank 116 and the prefetch buffer 117. In one embodiment, the FIFO interface 108 and the storage partitions 105 and 107 are clocked by a clock signal 118 provided by an on-chip or off-chip clock source 120. The FIFO interface 108 and the bank control logic 112 operate as FIFO control logic 113 to process PUSH and POP commands and transfer the corresponding data between the processor core 102 and the two storage partitions 105 and 107.

The FIFO interface 108 communicates with a memory interface 122 of the processor core 102 via different signaling, such as FIFO full (FULL) signaling, data PUSH signaling, data input (DATA_IN) signaling, FIFO empty (EMPTY) signaling, data POP signaling, and data output (DATA_OUT) signaling. The processor core 102 signals a PUSH command by asserting the data PUSH signaling and provides the data to be pushed into the FIFO buffer system 106 via the DATA_IN signaling. The processor core 102 signals a POP command by asserting the data POP signaling and subsequently receives the resulting data from the FIFO buffer system 106 via the DATA_OUT signaling. The FIFO interface 108 signals that the FIFO buffer system 106 is full by asserting the FULL signaling, and asserts that the FIFO buffer system 106 is empty by asserting the EMPTY signaling.

The FIFO interface 108 communicates with the storage element 110 via various signaling, including write data (WDATA) signaling, write address (WADDR) signaling, write enable (WE) signaling, read address (RADDR) signaling, and output ($Q_{OUT}$) signaling. In one embodiment, the WE signaling serves as both write enable signaling and read enable signaling such that a write access is signaled when the WE signaling is asserted and a read access is signaled when the WE signaling is unasserted. The FIFO interface 108 signals a write access in response to a PUSH command by asserting the WE signaling, provides a write memory address via the WADDR signaling, and provides the data to be written into the storage element 110 via the WDATA signaling. The FIFO interface 108 signals a read access in response to a POP command by deasserting the WE signaling, provides a read memory address via the RADDR signaling, and subsequently receives the resulting data from the storage element 110 via the $Q_{OUT}$ signaling.

The bank control logic 112 operates as a memory wrapper for the FIFO interface 108 to leverage the dual-partitioning of the storage element 110 so as to emulate a two-port memory using single-port memory banks. As part of this emulation, PUSH operations to the FIFO buffer system 106 are alternated, or toggled, between the storage partition 105 and the storage partition 107. Due to FIFO ordering, POP operations to the FIFO buffer system 106 consequently are also alternated or toggled between the storage partition 105 and the storage partition 107 in the same manner. Further, the bank control logic 112 employs the prefetch buffers 115 and 117 and corresponding prefetch logic to anticipate the next POP operation so that the read data for the next POP operation is available for output from the FIFO buffer system 106 in the same clock cycle in which the next POP operation is received.

To implement the alternating storage partition approach, each of the storage partitions 105 and 107 is associated with a different subset of addresses of the address space of the FIFO buffer system 106. For purposes of illustration, the different subsets in the following examples comprise the even addresses and the odd addresses of the address space, whereby the storage partition 105 is associated with the odd memory addresses of the address space of the FIFO buffer system 106 and the storage partition 107 is associated with the even memory addresses of the address space. Accordingly, the storage partition 105 and the storage partition 107 are also referred to herein as the odd partition 105 and the even partition 107, respectively. As such, the single-port memory bank 114 and 116 are also referred to herein as the odd memory bank 114 and the even memory bank 116, respectively, and the prefetch buffer 115 and the prefetch buffer 117 are also referred to as the odd prefetch buffer 115 and the even prefetch buffer 117, respectively. Likewise, the circuitry and signaling used specifically with respect to the odd partition 105 are designated with the term "odd" or the subscript "O" and the circuitry and signaling used specifically with respect to the even partition 107 are designated with the term "even" or the subscript "E." The designator "X" in subscript refers to either "even"/"E" or "odd"/"O". Although the embodiments of the present disclosure are described in the example context of the division of the address space into odd and even address subsets, the present disclosure is not limited to this particular division of the address space.

The bank control logic 112 communicates with the odd memory bank 114 via odd address ($ADDR_O$) signaling, odd write enable ($WE_O$) signaling, odd memory enable ($ME_O$) signaling, and odd memory output ($Q_{O\_M}$) signaling. The bank control logic 112 provides a memory address associated with a read or write access or a memory address associated with a prefetch command to the odd memory bank 114 via the $ADDR_O$ signaling. The bank control logic 112 signals a write access by asserting both the $WE_O$ signaling and the $ME_O$ signaling. The bank control logic 112 signals a read access by deasserting the $WE_O$ signaling and asserting the $ME_O$ signaling and subsequently receives the resulting data from the odd memory bank 114 via the $Q_{O\_M}$ signaling.

The bank control logic 112 communicates with the even memory bank 116 via even address ($ADDR_E$) signaling, even write enable ($WE_E$) signaling, even memory enable ($ME_E$) signaling, and even memory output ($Q_{E\_M}$) signaling. The bank control logic 112 provides a memory address associated with a read or write access or a memory address associated with a prefetch command to the even memory bank 116 via the $ADDR_E$ signaling. The bank control logic 112 signals a write access by asserting both the $WE_E$ signaling and the $ME_E$ signaling. The bank control logic 112 signals a read access by deasserting the $WE_E$ signaling and asserting the $ME_E$ signaling and subsequently receives the resulting data from the even memory bank 116 via the $Q_{E\_M}$ signaling.

During operation, the processor core 102 stores data in and receives data from the FIFO buffer system 106 in a FIFO order through the use of PUSH and POP commands. A PUSH command from the processor core 102 causes the FIFO buffer system 106 to store the corresponding data at the tail end of the FIFO order, and a POP command from the processor core 102 causes the FIFO buffer system 106 to output the data at the head end of the FIFO order.

In response to a PUSH command from the processor core 102, the FIFO interface 108 determines the memory address at which to store the data of the PUSH command and initiates a write access by outputting to the bank control logic 112 this memory address via the WADDR signaling, along with the data via the WDATA signaling, and asserting the WE signaling. In response to a POP command, the FIFO interface 108 determines the memory address at which the data at the head end of the FIFO order is stored and initiates a read access by outputting to the bank control logic 112 this memory address via the RADDR signaling and deasserting the WE signaling. For purposes of the following description, a relatively simple addressing scheme for the read and write accesses is used, whereby the initial write address WADDR is set to 0 (+offset) and each subsequent write is addressed by incrementing WADDR by 1 (WADDR+1), and such that the initial read address RADDR likewise is set to 0 (+offset) and each subsequent read is addressed by incrementing RADDR by 1 (RADDR+1). However, other addressing schemes for implementing the FIFO order in the memory 104 may be implemented.

A PUSH command triggers the FIFO interface 108 to determine the write address WADDR and provide to the bank control logic 112 the write address, the write data of the PUSH command, a memory enable, and a write enable via the WADDR, WDATA, ME and WE signaling, respectively. In response, the bank control logic 112 identifies whether to direct the write access to the even partition 107 or the odd partition 106 based on whether the write address WADDR is an even or odd address and initiates the write to the memory bank of the selected partition using the corresponding address, write enable, memory enable and write data signaling for the selected partition. Further, in the event that the prefetch buffer for the selected partition is empty (i.e., does not store valid data), the write data is written to that prefetch buffer as the write data will be the read data for the next POP command processed by the selected partition.

A POP command triggers the FIFO interface 108 to determine the read address RADDR and provide to the bank control logic 112 the read address and a memory enable via the RADDR and ME signaling, respectively. In response, the bank control logic 112 identifies whether to direct the read access to the even partition or the odd partition based on whether the read address RADDR is an even or odd address and initiates the read access to the memory bank of the selected partition using the corresponding address and memory enable signaling for the selected partition. As described in greater detail below, the bank control logic 112 anticipates the next POP commands by initiating prefetches of data for the next POP commands before they are received. Accordingly, the read data sought by the read access is either available from the prefetch buffer of the corresponding partition if the prefetch of the data was able to complete (that is, latched in the prefetch buffer) before the POP command was issued, or from the output $Q_{X\_M}$ of the corresponding memory bank even if the prefetch of the data was not able to complete before the POP command was issued. By alternating PUSH commands, and thus POP commands, between the odd partition 105 and even partition 107 and by initiating a prefetch of read data from the corresponding memory bank before the next POP command that hits on the corresponding storage partition is received, the FIFO control logic 113 typically can ensure that the read data will be available either on the output of the corresponding memory bank or in the corresponding prefetch buffer at the time the POP command received, thereby allowing the read data to be output from the FIFO buffer system 106 during the same clock cycle as the next POP command is received. The read data is then supplied from the bank control logic 112 to the FIFO interface 108 via signaling $Q_{OUT}$, and the FIFO interface 108 in turn provides this data via signaling DATA_OUT.

The FIFO interface 108 tracks the current number of data elements stored in the FIFO buffer system 106 by incrementing a data level count each time data is written to the storage element 110 by decrementing the data level count each time data is read from the storage element. The data count level is provided to the bank control logic 112 via the LEVEL signaling, and the bank control logic 112 can use the data level count to determine whether write data for a PUSH command being processed by a selected one of the partitions 105 and 107 can be stored directly to the prefetch buffer of the selected partition, as described above and in greater detail below.

Figure 2:
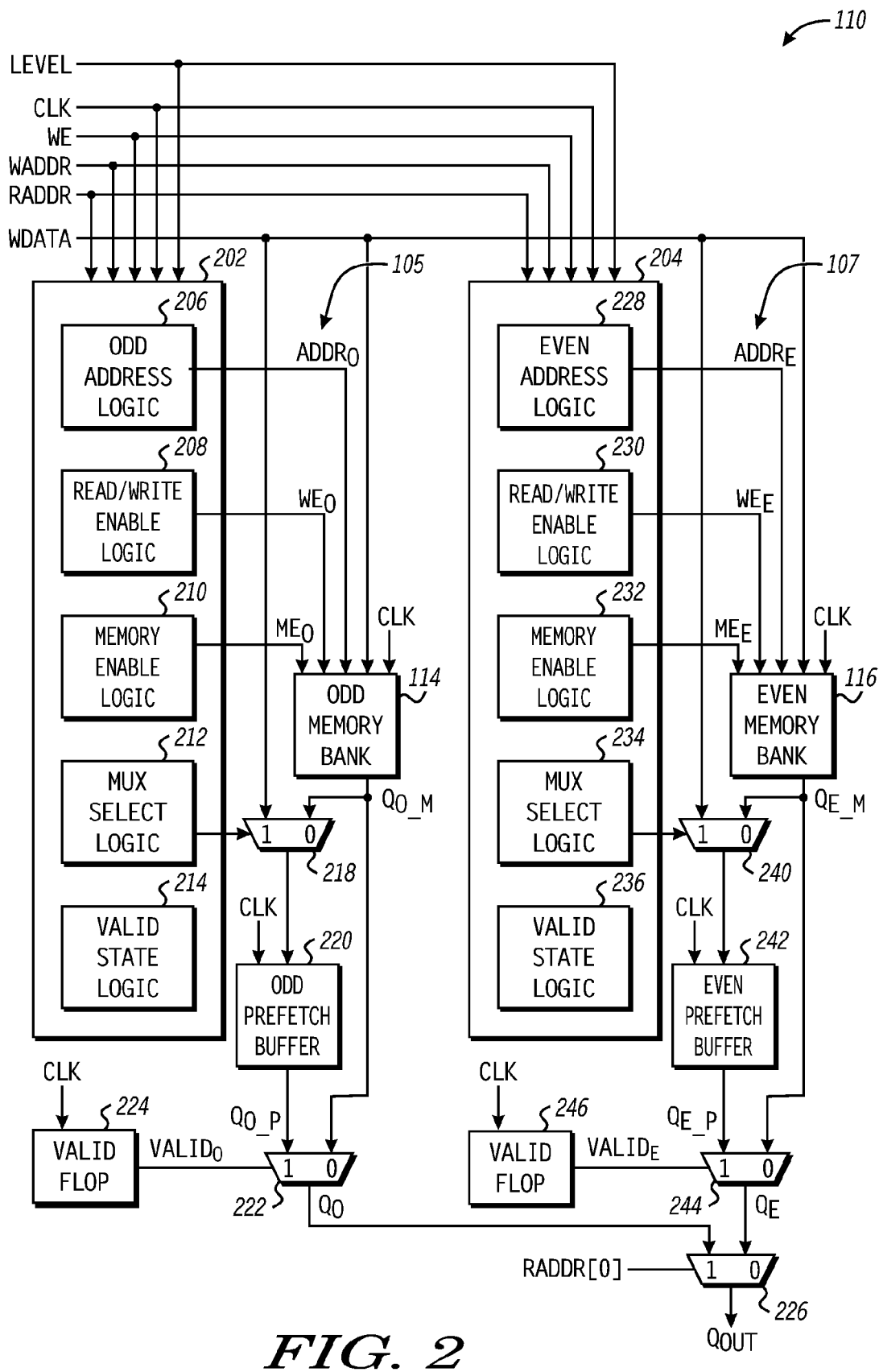
FIG. 2 illustrates a storage element of the FIFO buffer system of FIG. 1 in accordance with at least one embodiment of the present disclosure.

FIG. 2 illustrates an example implementation of the storage element 110 of FIG. 1 in accordance with at least one embodiment of the present disclosure. As noted above, the storage element 110 can be partitioned into an odd partition 105 associated with odd memory bank 114 and odd prefetch buffer 115 and an even partition 107 associated with even memory bank 116 and even prefetch buffer 117. Along this division, the bank control logic 112 of the storage element 110 is partitioned into odd address control logic 202 and even address control logic 204 for operation with the odd memory bank 114 and the even memory bank 116, respectively. The odd address control logic 202 includes odd address logic 206, odd read/write enable logic 208, odd memory enable logic 210, odd multiplexer select logic 212, and odd valid state logic 214. The storage element 110 also includes a multiplexer 218, the odd prefetch buffer 115, a multiplexer 222, a valid odd bank flop 224, a multiplexer 226, and the odd memory bank 114. The even address control logic 204 includes even address logic 228, even read/write enable logic 230, even memory enable logic 232, even multiplexer select logic 234, and even valid state logic 236. The storage element 110 also includes a multiplexer 240, the even prefetch buffer 117, a multiplexer 244, a valid even bank flop 246, and the even memory bank 116. The odd address control logic 202 and the even address control logic 204 are both in communication with the FIFO interface 108 of FIG. 1 via various signaling as discussed above with respect to the bank control logic 112 of FIG. 1.

In the depicted embodiment, the odd memory bank 114 includes inputs to receive the CLK, $ADDR_O$, $WE_O$, $ME_O$, and WDATA signaling, and an output $Q_{O\_M}$. The odd memory bank 114 stores write data WDATA to a location at address $ADDR_O$ in response to the assertion of the $WE_O$ and $ME_O$ signaling. The odd memory bank 114 provides at output $Q_{O\_M}$ read data stored at the address $ADDR_O$ in response to the assertion of the $ME_O$ signaling and deassertion of the $WE_O$ signaling.

The multiplexer 218 includes an input to receive the WDATA signaling, an input connected to the output $Q_{O\_M}$ of the odd memory bank 114, and an output that is selected between the two inputs based on a mux select input received from the MUX select logic 212. The odd prefetch buffer 115 includes an input coupled to the output of the multiplexer 218, an input to receive the CLK signaling, and an output $Q_{O\_P}$ to provide the data, if any, buffered in the odd prefetch buffer 115. The multiplexer 222 includes an input coupled to the output $Q_{O\_P}$ of the odd prefetch buffer 115, an input coupled to the output $Q_{O\_M}$ of the odd memory bank 114, and an output $Q_O$ that is selected from $Q_{O\_M}$ or $Q_{O\_P}$ based on the state of a signal $VALID_O$ provided by the valid odd bank flop 224. The output $Q_O$ of the multiplexer 222 in turn is coupled to an input of the multiplexer 226.

In an arrangement reflective of the odd memory bank 114, the even memory bank 116 includes inputs to receive the CLK, $ADDR_E$, $WE_E$, $ME_E$, and WDATA signaling, and an output $Q_{E\_M}$. The even memory bank 116 stores write data WDATA to a location at address $ADDR_E$ in response to the assertion of the $WE_E$ and $ME_E$ signaling. The even memory bank 116 provides at output $Q_{E\_M}$ read data stored at the address $ADDR_E$ in response to the assertion of the $ME_E$ signaling and deassertion of the $WE_E$ signaling.

The multiplexer 240 includes an input to receive the WDATA signaling, an input connected to the output $Q_{E\_M}$ of the even memory bank 116, and an output that is selected between the two inputs based on a mux select input received from the MUX select logic 234. The even prefetch buffer 117 includes an input coupled to the output of the multiplexer 240, an input to receive the CLK signaling, and an output $Q_{E\_P}$ to provide the data, if any, buffered in the even prefetch buffer 117. The multiplexer 244 includes an input coupled to the output $Q_{E\_P}$ of the even prefetch buffer 117, an input coupled to the output $Q_{E\_M}$ of the even memory bank 116, and an output $Q_E$ that is selected from $Q_{E\_M}$ or $Q_{E\_P}$ based on the state of a signal $VALID_E$ provided by the valid even bank flop 246. The output $Q_E$ of the multiplexer 244 in turn is coupled to the other input of the multiplexer 226.

The signal $VALID_O$ is used to indicate whether the odd prefetch buffer 115 contains valid data. In this example, a state of "0" for the signal $VALID_O$ indicates that the odd prefetch buffer 115 does not contain valid data (that is, the odd prefetch buffer 115 is empty). Conversely, a state of "1" for the signal $VALID_O$ indicates that the odd prefetch buffer 115 contains valid data (that is, the odd prefetch buffer 115 is full). The signal $VALID_E$ is similarly used with respect to the even prefetch buffer 117. In at least one embodiment, the valid state logic 214 and 236 operate to control the states of the signals VALID$_O$ and VALID$_E$, respectively, and thus control whether the data output from a given partition is from the prefetch buffer or the output of the memory bank (via the corresponding one of multiplexers 222 and 224). When data is accessed from a prefetch buffer, the valid state logic switches the state of the signal VALID from "1" to "0". When prefetched data is latched into a prefetch buffer, the valid state logic switches the state of the signal VALID$_X$ from "0" to "1".

In the event of a POP command in the current clock cycle, the multiplexer 226 provides as an output Q$_{OUT}$ one of Q$_O$ or Q$_E$ based on whether the POP command is processed by the odd or even partition. In the illustrated embodiment, the indication of the partition processing the POP command is indicated by the least significant bit RADDR[0] of the read address RADDR generated for the read access for the POP command.

On the odd partition, the various odd partition logic blocks operate to control the odd memory bank 114, the odd prefetch buffer 115, and the multiplexers 218 and 212 to store write data for PUSH commands that are toggled to the odd partition in the odd memory bank 114 and the odd prefetch buffer 115 (if empty), and to output read data for POP commands that are toggled to the odd partition either from the output Q$_{O\_P}$ of the odd prefetch buffer 115 (if the odd prefetch buffer 115 contains valid data) or from the output Q$_{O\_M}$ of the odd memory bank 114 (if the odd prefetch buffer 115 does not contain valid data). On the even partition, the various even partition logic blocks operate to control the even memory bank 116, the even prefetch buffer 117, and the multiplexers 240 and 244 to store write data for PUSH commands that are toggled to the even partition in the even memory bank 116 and the even prefetch buffer 117 (if empty), and to output read data for POP commands that are toggled to the even partition either from the output Q$_{E\_P}$ of the odd prefetch buffer 117 (if the even prefetch buffer 117 contains valid data) or from the output Q$_{E\_M}$ of the even memory bank 114 (if the even prefetch buffer 117 does not contain valid data). The operation of the storage element 110 of FIG. 2 for these PUSH and POP commands is described in more detail subsequently with reference to FIGS. 3 and 4.

As noted above, PUSH commands are alternated, or toggled, between the even partition 105 and odd partition 107 of the FIFO buffer system 106, as are POP commands in order to track the alternated PUSH commands. This allows each partition to operate concurrently, thereby allowing the two single-port memory banks 114 and 116 to together emulate a two-port memory. This emulation permits the concurrent processing of a PUSH command and a POP command in the same clock cycle. Moreover, each partition implements a corresponding prefetch process that anticipates the next read access (POP) to the partition by initiating a prefetch for the read data for the anticipated next read access. If the prefetched read data has been latched into the prefetch buffer (that is, the prefetch has completed) in time for the next read access, the prefetched read data is accessed and output from the prefetch buffer. If the prefetched read data has not yet had time to latch into the prefetch buffer in time for the next read access (that is, the prefetch has not completed), such as when a POP command is directed to the corresponding partition in the same clock cycle in which the prefetch was initiated, the prefetched read data is accessed and output from the output of the memory bank for the partition. By initiating prefetches of the next read data and making the prefetched data available via either the prefetch buffer or the output of the memory bank, not only can the two single-port memory banks 114 and 116 emulate a two-port memory, but the frame buffer system 106 can access and output the read data for a POP command in the same clock cycle as the POP command is received, thereby avoiding the one clock cycle delay (or more) typically found in conventional FIFO buffer architectures.

Figure 3:
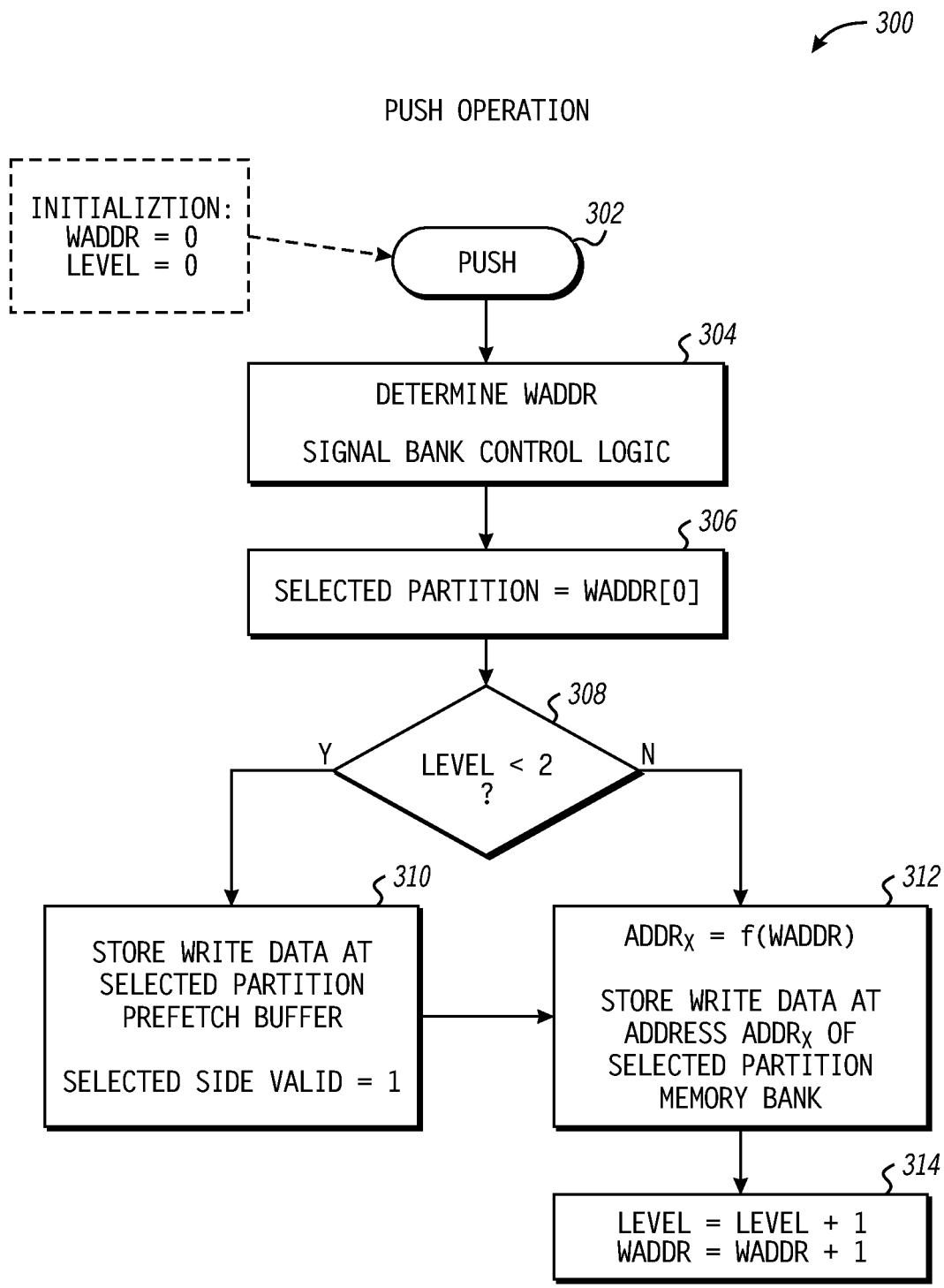
FIG. 3 illustrates a method for implementing a PUSH operation in accordance with at least one embodiment of the present disclosure.

FIG. 3 illustrates an example method 300 for processing a PUSH command at the FIFO buffer system 106 of FIGS. 1 and 2 in accordance with at least one embodiment of the present disclosure. Prior to processing PUSH commands, the FIFO control logic 113 is initialized (e.g., at reset) by, for example, setting the write address WADDR to an initial value, such as 0 (+offset) and setting the data level count value LEVEL to zero or some other predetermined value. The method 300 initiates when a PUSH command is received at the FIFO interface 108 at block 302. In response, at block 304 the FIFO interface 108 determines the write address WADDR for implementing a write access to the storage element 110. As noted above, for purposes of this example it is assumed that each successive write access to the FIFO buffer is addressed by incrementing the previous write address WADDR by 1. Other addressing schemes that maintain the even/odd address partitioning could be implemented instead. The FIFO interface 108 then signals the bank control logic 112 with the write data and write address WADDR, as well as the other appropriate signaling.

At block 306, the bank control logic 110 selects which storage partition is to process the PUSH command. As noted above, PUSH commands are alternated between the odd and even partitions. Since the write address WADDR in this example is incremented by 1 between each PUSH command, this even-partition/odd-partition toggling can be controlled by the least significant bit WADDR[0] of the write address. Thus, the partition to process the PUSH command, denoted as the "selected partition" in FIG. 3 is selected to be the even partition if WADDR[0] is "0" (that is, an even address) or the odd partition if WADDR[0] is "1" (that is, an odd address). In the implementation of FIG. 2, this determination is separately made by each of the odd address logic 206 and the even address logic 228. The address logic of the selected partition determines an address ADDR$_X$ at which to store the write data WDATA and enables the read/write enable logic to assert the corresponding write enable (WE$_X$) signal and enables the memory enable logic to assert the corresponding memory enable (ME$_X$) signal so as to enable storage of the write data WDATA at the location at address ADDR$_X$ of the memory bank of the selected partition. Note that because memory banks 114 and 116 are separate memories and thus addressed independently, the address ADDR$_X$ typically is not the same as the write address WADDR. In this example, it is assumed that the address ADDR$_X$ generated for a partition is initialized to 0 (+offset) and incremented by 1 for each write access to that partition, although other addressing schemes can be used as appropriate. On the partition not selected to process the PUSH command ("the unselected partition"), the address logic of the unselected partition disables the read/write logic of the unselected partition from asserting the write enable signaling, thereby preventing the write data from being stored in the memory bank of the unselected partition.

In the event that there is only one data element buffered at the FIFO buffer system 106 (that is, while the data level count LEVEL <2), the data pushed to a particular partition of the FIFO buffer system 106 will be the next data to be popped from the particular partition due to the FIFO order and the partition-to-partition toggling. It therefore is advantageous from a timing perspective to buffer the data pushed into the particular partition in the prefetch buffer in this situation so that it is readily available for output from the prefetch buffer when the next POP command comes in for the particular partition. Accordingly, at block 308 the mux select logic of the selected partition determines whether there are fewer than two data elements buffered at the FIFO buffer system 106 (e.g., whether the data level count LEVEL <2). If LEVEL <2, the selected partition necessarily is empty as a result of the even-odd partition toggling, and thus prefetch buffer of the selected partition is empty. Accordingly, the mux select logic controls the corresponding multiplexer 218 or 240 to output the write data WDATA to the input of the prefetch buffer for storage at the prefetch buffer at block 310. At the next triggering clock edge following the input of the write data WDATA to the prefetch buffer, the write data WDATA is latched into the prefetch buffer and the valid state logic for the selected partition sets the $VALID_X$ indicator to "1", thereby indicating that the data in the prefetch buffer is valid and available for output. Otherwise, if LEVEL is 2 or greater, the prefetch buffer is bypassed and the valid state logic for the selected partition does not modify the state of the VALID indicator.

At block 312, the read/write enable logic and the memory enable logic of the selected partition assert the write enable $WE_X$ signal and the memory enable $ME_X$ signal, respectively, and the write data WDATA is stored at in the memory bank of the selected partition at the address $ADDR_X$ generated by the address logic of the selected partition.

At block 314, the FIFO interface 108 increments the data level count LEVEL by one to reflect that a data element has been stored at the FIFO buffer system 106 and the FIFO interface 108 determines the write address WADDR for the next PUSH command by incrementing WADDR by 1. Note that with the exception of setting the signal VALID for the selected partition when the write data is latched into the prefetch buffer at block 310, the logic used to implement the method 300 is asynchronous and thus can be performed within the same clock cycle of the clock signal 118. The process of method 300 can be repeated for the next PUSH command received by the FIFO buffer system 106.

Figure 4:
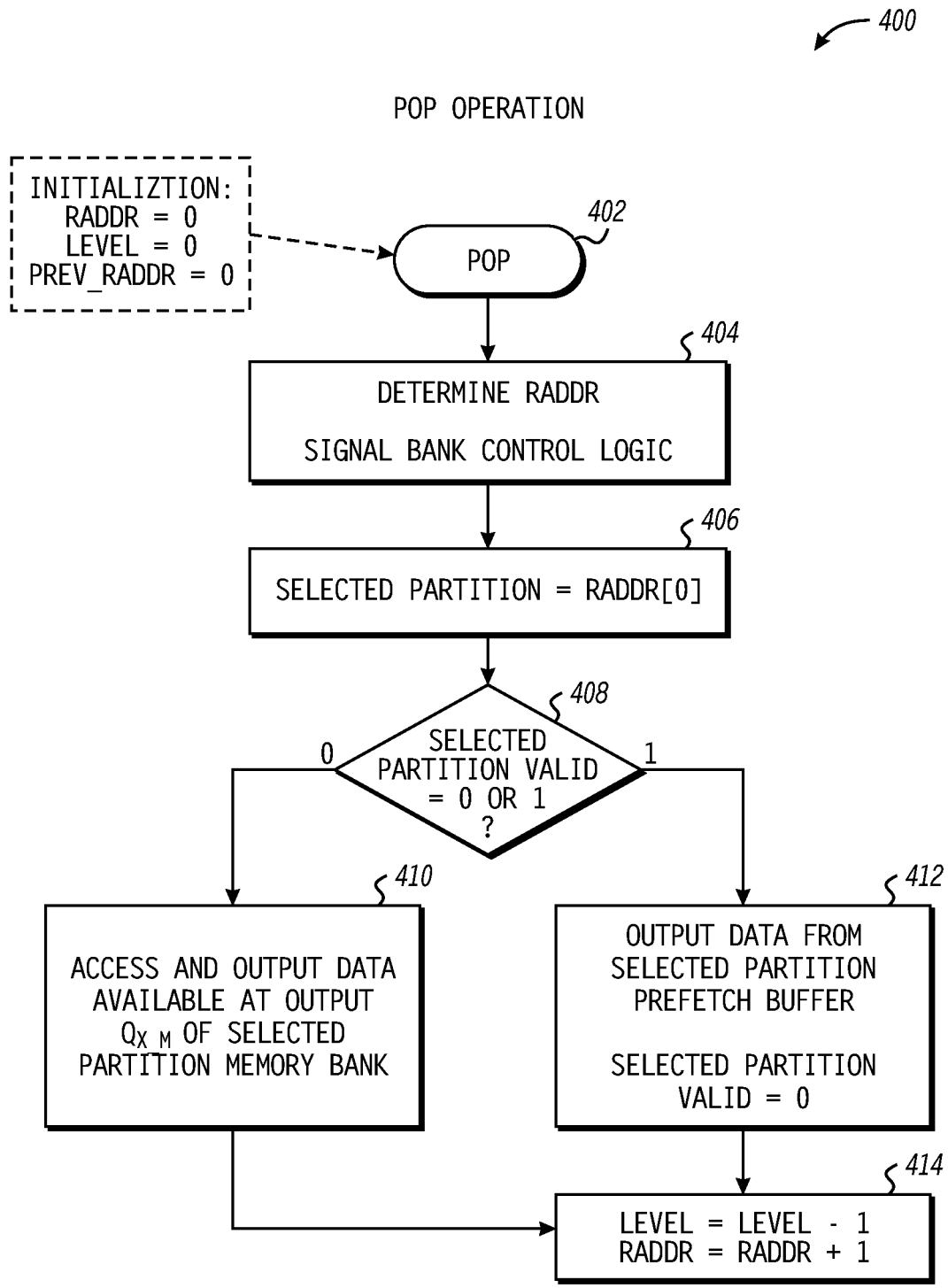
FIG. 4 illustrates a method for implementing a POP operation in accordance with at least one embodiment of the present disclosure.

FIG. 4 illustrates an example method 400 for processing a POP command at the FIFO buffer system 106 of FIGS. 1 and 2 in accordance with at least one embodiment of the present disclosure. Prior to processing POP commands, the FIFO control logic 113 is initialized (e.g., at reset) by, for example, setting the read address RADDR to an initial value, such as 0 (+offset) and setting the data level count value LEVEL to zero or some other predetermined value. The method 400 initiates when a POP command is received at the FIFO interface 108 at block 402. In response, at block 404 the FIFO interface 108 determines the read address RADDR for implementing a read access to the storage element 110. As noted above, for purposes of this example it is assumed that each successive read access to the FIFO buffer is addressed by incrementing the previous read address RADDR by 1. The FIFO interface 108 then signals the bank control logic 112 with the read address RADDR, as well as the other appropriate signaling.

At block 406, the bank control logic 110 selects which partition is to process the POP command. As noted above, POP commands are toggled between the odd and even partitions. Since the read address RADDR in this example is incremented by 1 between each POP command, this even-partition/odd-partition toggling can be controlled by the least significant bit RADDR[0] of the read address. Thus, the partition to process the POP command, denoted as the "selected partition" in FIG. 4 is selected to be the even partition if RADDR[0] is "0" (that is, an even address) or the odd partition if RADDR[0] is "1" (that is, an odd address). In the implementation of FIG. 2, this determination is made by each of the odd address logic 206 and the even address logic 228.

As described in greater detail with reference to FIG. 5, the control logic for each partition implements a prefetch process to prefetch the read data for the next anticipated POP operation to be processed by that partition. However, because both the memory banks 114 and 116 and the prefetch buffers 115 and 117 are synchronous with respect to the clock signal 18, data prefetched in one clock cycle typically will not be latched and ready (with VALID=1) until the following clock cycle. However, the data prefetched from the memory bank of the partition in any given clock cycle will be available at the output of the memory bank in that clock cycle. Accordingly, at block 408, the control logic of the selected partition uses the $VALID_X$ signal for the selected partition to determine whether the read data for the POP operation is ready and available from the prefetch buffer of the selected partition or the read data for the POP operation will need to be accessed from the output of the memory bank for the selected partition (i.e., VALID=0).

In the event that the prefetched data is not available from the prefetch buffer (e.g., VALID=0), at block 410 the corresponding multiplexer (multiplexer 222 or multiplexer 244 depending on partition) selects for output the data at the output of the memory bank of the selected partition and the multiplexer 226 selects this data for output to the FIFO interface 108, which in turn outputs the data as DATA_OUT to the processor core 102. Alternatively, in the event that the prefetched data is available from the prefetch buffer (e.g., VALID=1), at block 412 the corresponding multiplexer (multiplexer 222 or multiplexer 244 depending on partition) selects for output the data at the output of the prefetch buffer of the selected partition and the multiplexer 226 selects this data for output to the FIFO interface 108, which in turn outputs the data as DATA_OUT to the processor core 102. Because the data in the prefetch buffer has been output and thus is no longer valid, the valid state logic of the selected partition sets the state of the VALID signal to "0" to identify the prefetch buffer as not containing valid data.

At block 414, the FIFO interface 108 decrements the data level count LEVEL to reflect that a POP operation has been completed and the FIFO interface 108 determines the read address RADDR for the next POP command by incrementing RADDR by 1. Note that due to the asynchronous nature and the early availability of the read data due to prefetching, the process of receiving the POP command and accessing and outputting the read data for the POP command of method 400 can be performed within the same clock cycle of the clock signal 118. The process of method 400 then can be repeated for the next POP command received by the FIFO buffer system 106.

Figure 5:
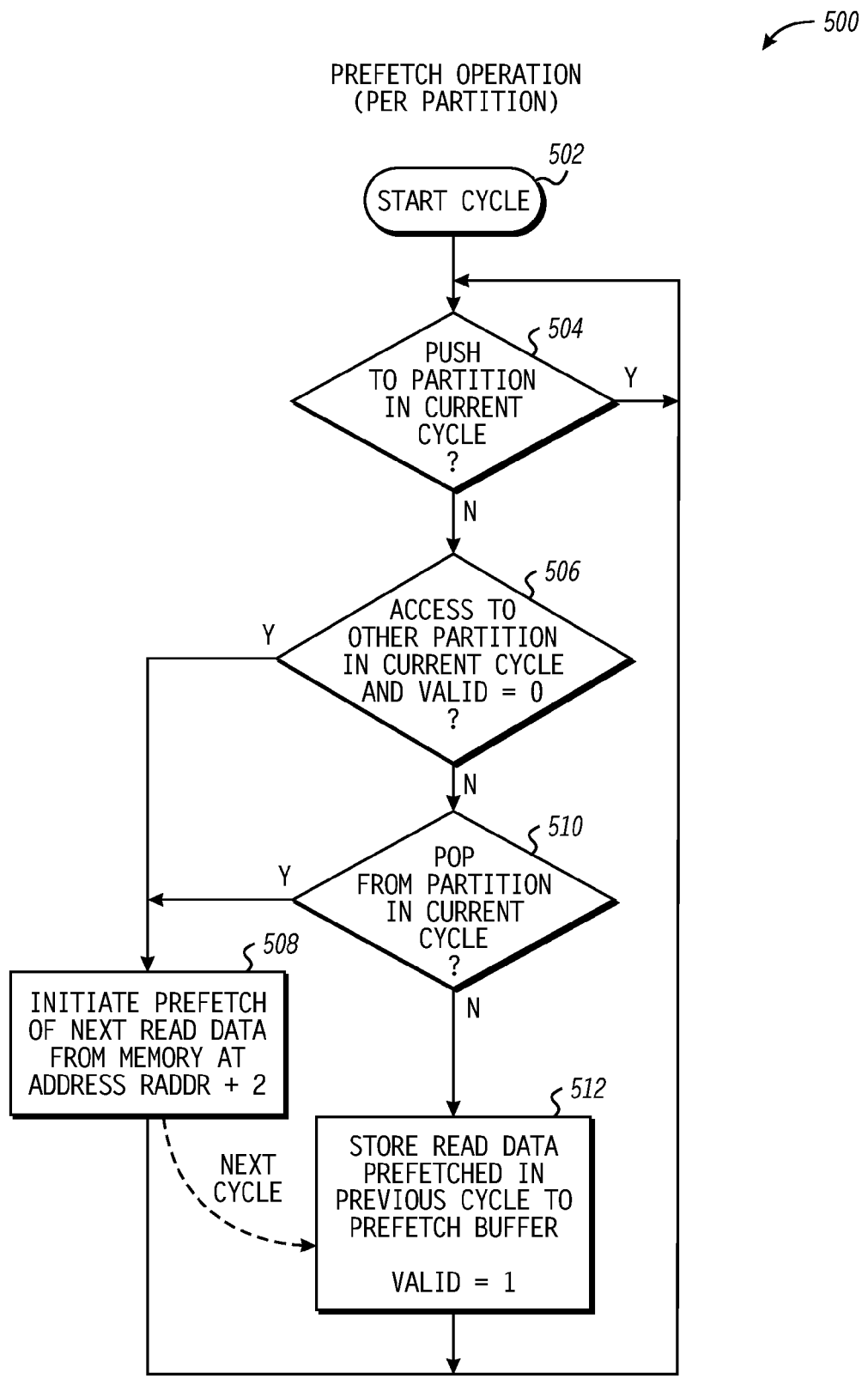
FIG. 5 illustrates a method for prefetching data in anticipation of a next POP operation in accordance with at least one embodiment of the present disclosure.

FIG. 5 illustrates a method 500 for prefetching read data in anticipation of the next POP operation to be processed by a given partition in accordance with at least one embodiment of the present disclosure. The prefetch process of method 500 is performed on a per-partition basis (that is, the odd partition and even partition each independently perform the prefetch process represented by method 500), and the prefetch process at a given partition can at least be initiated concurrently with a POP operation at the given partition.

The method 500 initiates for a given partition at block 502 with the start of a clock cycle of the clock 118. At block 504, the control logic for the given partition determines whether there is a PUSH operation to be performed at the given partition in the current clock cycle. Since the memory bank is a single-port memory, a prefetch to the memory bank cannot be performed while there is a write to the memory bank. Accordingly, if a PUSH operation is to be performed in the current clock cycle for the given partition, the control logic for the given partition aborts the prefetch process for the current clock cycle and begins the process of method 500 anew for the next clock cycle of the clock signal 118.

Otherwise, if no PUSH operation is pending for the given partition in the current clock cycle, at block 506 the control logic for the given partition monitors the activity at the other partition to determine whether a read or write access has occurred at the other partition during the current clock cycle. Due to the partition-to-partition toggling of PUSH and POP operations, an access at the other partition during the current clock cycle indicates that the given partition will be the partition selected for the next POP operation to follow in the next clock cycle or other subsequent clock cycle. Accordingly, if an access to the other partition is detected and if the prefetch buffer for the given partition is empty ($VALID_X=0$), at block 508 the address logic, read/write enable logic, and memory enable logic of the given partition operate to initiate a prefetch of the read data for the anticipated next POP operation from the memory bank for the given partition. In one embodiment, the address logic for the given partition determines the address for the prefetch by advancing the current read address RADDR by 2 (thus determining the next RADDR for the given partition) and determines the address $ADDR_X$ for the read access to the memory bank of the given partition as a function of the address of the prefetch. The memory bank for the given partition accesses the indicated location and outputs the data stored therein at the output $Q_{X\_M}$.

In the event that an access to the other partition is not detected in the current clock cycle or if the prefetch buffer for the given partition contains valid data, at block 510 the control logic for the given partition determines whether a POP operation is pending for the given partition. A POP operation pending for the given partition means that the prefetch buffer for the partition will be empty at the end of the clock cycle, and thus the prefetch buffer will be available to partition prefetched read data. Accordingly, in response to a pending POP operation for the given partition, the method 500 proceeds to block 508 to initiate the prefetch for the anticipated next POP operation.

Otherwise, if a POP operation is not pending, at block 512 the data at the output of the memory bank of the given partition, which is a result of a prefetch operation initiated at block 508 for the previous iteration of method 500 for the previous clock cycle, is latched into the prefetch buffer of the given partition and the valid state logic sets the state of the VALID signal to "1" for the given partition, thereby signaling that the prefetch buffer of the given partition contains valid prefetch data available for the next POP operation to the given partition.

Table 1 below illustrates the relationship between prefetch operations and PUSH and POP operations in accordance with the prefetch process of FIG. 5:

TABLE 1

Circumstances for Prefetch

| Scenario | Access Operations | Prefetch Even? | Prefetch Odd? |
|---|---|---|---|
| 1 | PUSH to Even Partition | NO (blocked by write) | YES if $VALID_O = 0$ |
| 2 | POP from Even Partition | YES | YES if $VALID_O = 0$ |
| 3 | Concurrent PUSH and POP from Even Partition | No (blocked by write) | YES if $VALID_O = 0$ |
| 4 | PUSH to Odd Partition | YES if $VALID_E = 0$ | NO (blocked by write) |
| 5 | POP from Odd Partition | YES if $VALID_E = 0$ | YES |
| 6 | Concurrent PUSH to and POP from Odd Partition | YES if $VALID_E = 0$ | No (blocked by write) |

The ability to initiate a prefetch operation for a given partition is governed by three factors: (1) the memory bank for a given partition is a single-port memory and a prefetch (read) access to the memory bank cannot occur while there is a write access; (2) the prefetch buffer has a depth of 1 in the current embodiment, and thus a prefetch is not performed if the prefetch buffer contains valid data (i.e., while VALID=1); and (3) a POP operation to a partition clears the prefetch buffer of valid data, and thus opens up the partition to a prefetch in the same clock cycle in which the POP operation is performed to the partition if a PUSH operation also is not performed to the partition. Situation 1 illustrates a situation whereby both factors (1) and (2) come into play in that a PUSH operation to the even partition blocks a prefetch on the even partition, and a prefetch on the odd partition is only performed if the prefetch buffer on the odd partition does not have valid data. Situation 2 illustrates a situation whereby factors (2) and (3) come into play in that a POP operation to the even partition permits a prefetch operation to initiate on the even partition, and a prefetch on the odd partition is only performed if the prefetch buffer on the odd partition does not have valid data. Situation 3 illustrates a situation where factors (1), (2), and (3) come into play in that a concurrent PUSH operation and POP operation to the even partition prevents a prefetch operation to the even partition due to the PUSH operation to the even partition (even though there also is a POP operation to the even partition), and a prefetch on the odd partition is only performed if the prefetch buffer on the odd partition does not have valid data. Situations 4, 5, and 6 represent operations performed with respect to the odd partition, and thus are symmetric to situations 1, 2, and 3, respectively.

Figure 6:
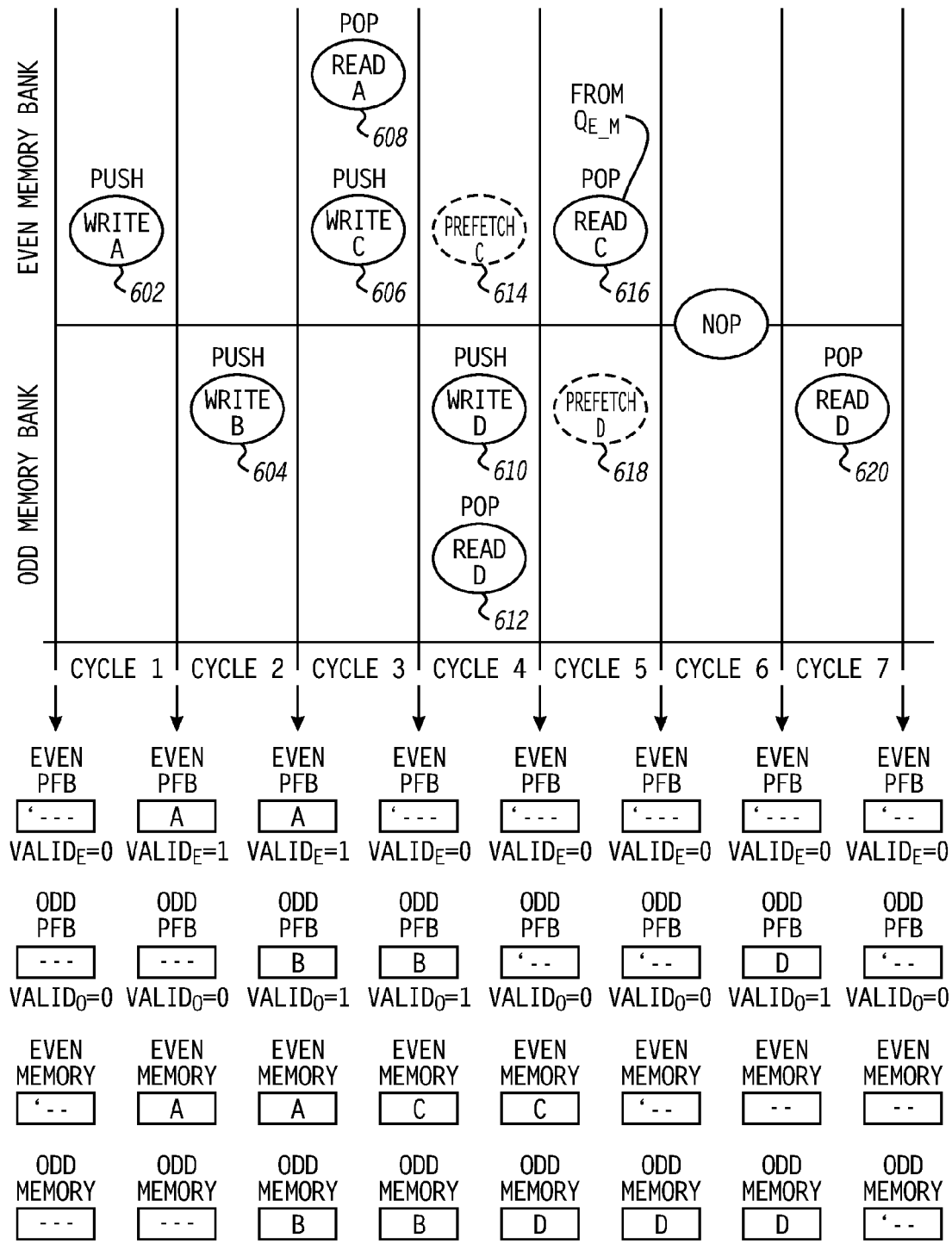
FIG. 6 illustrates a timing diagram depicting an example sequence of PUSH and POP operations for the FIFO buffer system of FIG. 1 in accordance with at least one embodiment of the present disclosure.

FIG. 6 illustrates a timing diagram 600 for an example operation of the FIFO buffer system 106 of the processing system 100 of FIG. 1 in accordance with at least one embodiment of the present disclosure. The timing diagram 600 illustrates seven clock cycles (clock cycles 1-7) of clock signal 118, starting with the FIFO buffer system 106 in an initial, empty state. FIG. 6 also depicts the states of the odd prefetch buffer 115 ("Odd PFB"), the even prefetch buffer 117 ("Even PFB"), the odd memory bank 114 ("Odd Memory"), the even memory bank 116 ("Even Memory"), and the valid indicators $VALID_E$ and $VALID_O$ at the conclusion of each clock cycle.

In the depicted example, the FIFO buffer system 106 is subjected to a FIFO command sequence {PUSH (data A)-PUSH (data B)-PUSH (data C) AND POP (data A)-PUSH (data D) AND POP (data B)-POP (data C)-No PUSH/POP (NOP)-POP (data D)}, with PUSH (data A) being the first command in the sequence and with the FIFO buffer system 106 being empty at the start of the FIFO command sequence. As noted above, the FIFO buffer system 106 operates by alternating PUSH operations between the even partition 107 and the odd partition 105, which results in alternating POP operations due to the FIFO order.

During clock cycle 1, the PUSH (data A) command initiates a write access 602 that stores data A in the even memory bank 116 and, because $VALID_E=0$, also stores data A in the even prefetch buffer 117, which causes a transition of $VALID_E$ to $VALID_E=1$ at the end of clock cycle 1. During clock cycle 2, the PUSH (data B) command initiates a write access 604 that stores data B in the odd memory bank 114 and, because $VALID_O=0$, also stores data B in the odd prefetch buffer 115, which causes a transition of $VALID_O$ to $VALID_O=1$ at the end of clock cycle 2.

During clock cycle 3, the PUSH (data C) command and POP (data A) command occur concurrently. In one embodiment, PUSH operations take precedence over POP operations, and a write operation 606 is performed for the PUSH (data C) command, which results in the data C being written to the even memory bank 116. Since the even prefetch buffer 117 is occupied by data A at the time (i.e., $VALID_E=1$), the even prefetch buffer 117 retains data A. However, the POP (data A) command then triggers a read operation 608 in the same clock cycle 3, which results in the data A being read out from the even prefetch buffer 117 at the same time the data C is written to the even memory bank 116. The output of the data A from the even prefetch buffer 117 triggers a change in state of the signal $VALID_E$ to $VALID_E=0$ at the end of clock cycle 3 so as to indicate that the even prefetch buffer 117 is empty.

During clock cycle 4, the PUSH (data D) operation and POP (data B) operation occur concurrently. As the PUSH operation takes precedence, the FIFO buffer system 106 first initiates a write access 610 to write the data D to the odd memory 114. Since the odd prefetch buffer 115 is occupied by data B at the time (i.e., $VALID_O=1$), the odd prefetch buffer 115 retains data B. However, the POP (data B) operation then triggers a read access 612 in the same clock cycle 4, which results in the data B being read out from the odd prefetch buffer 115 at the same time the data D is written to the even memory bank 116. The output of the data B from the odd prefetch buffer 115 triggers a change in state of the signal $VALID_O$ to $VALID_O=0$ at the end of clock cycle 4 so as to indicate that the odd prefetch buffer 115 is empty. Also during clock cycle 4, per situation 6 of Table 1 above, a prefetch operation 614 is initiated for the even partition because there is an access (POP(data B)) being performed at the odd partition during clock cycle 4 and the even prefetch buffer 117 for the even partition 107 is empty at the start of clock cycle 4 ($VALID_E=0$ at the start of clock cycle 4).

During clock cycle 5, the POP (data C) operation triggers a read access 616 of data C from the even partition. However, since the prefetch of the data C initiated during clock cycle 4 has not yet latched into the even prefetch buffer 117 at this point, the FIFO buffer system 106 cannot output the data C from the even prefetch buffer 117. However, the prefetch initiated during clock cycle 4 has made the data C available at the output $Q_{E\_M}$ of the even memory bank 116, and thus the FIFO buffer system 106 accesses the data C from the output of the even memory bank 116 in response to the POP (data C) operation. Also during clock cycle 5, per situation 2 of Table 1 above, a prefetch operation 618 is initiated for the odd partition 105 because there is a POP operation (POP(data C)) being performed at the even partition during clock cycle 5 and the prefetch buffer for the odd partition is empty at the start of clock cycle 5 ($VALID_O=0$ at the start of clock cycle 5).

During clock cycle 6, there are no PUSH or POP commands issued. Because there is no POP command to the odd partition during clock cycle 6, the prefetch for data D initiated in clock cycle 5 permits the data D to be latched into the odd prefetch buffer 115 at the end of clock cycle 6, thereby changing the state of signal $VALID_O$ to $VALID_O=1$ to indicate that the odd prefetch buffer 115 now contains valid data. Accordingly, at clock cycle 7 the POP (data D) operation triggers a read access 620 to the odd partition, which results in the data D being output from the odd prefetch buffer 115 since the signal $VALID_O=1$ at the time of the read access 620.

In accordance with one aspect of the present disclosure, a first-in first-out (FIFO) buffer system is provided. The FIFO buffer system includes a first storage partition having a single-port memory bank with an input to receive a clock signal. In this case, the first storage partition is associated with a first subset of memory addresses. The FIFO buffer system also includes a second storage partition having a single-port memory bank with an input to receive the clock signal. In this case, the second storage partition is associated with a second subset of memory addresses. The FIFO buffer system further includes FIFO control logic coupled to the first and second storage partitions and having an input to receive the clock signal. The FIFO control logic is to access and output data from a selected one of the first and second storage partitions in a same clock cycle of the clock signal in which a read access for the data is received.

In one embodiment, the FIFO control logic is further to select the selected one of the first and second storage partitions based on an alternating of read accesses between the first storage partition and the second storage partition. In one embodiment, the first subset of memory addresses is even memory addresses and the second subset of memory addresses is odd memory addresses. In this case, the FIFO buffer system is to select the selected one of the first and second storage partitions based on whether a read address for the read access is an even address or an odd address.

In one embodiment, the first storage partition further includes a prefetch buffer having an input to receive the clock signal, and the second storage partition further includes a prefetch buffer having an input to receive the clock signal. In this case, the FIFO control logic is to prefetch data from the single-port memory bank of the first storage partition to the prefetch buffer of the first storage partition and to prefetch data from the single-port memory bank of the second storage partition to the prefetch buffer of the second storage partition. In one embodiment, the FIFO control logic is further to access and output the data from the selected one of the first and second storage partitions by accessing and outputting data from the prefetch buffer of the selected one of the first and second storage partitions in response to determining the prefetch buffer of the selected one of the first and second storage partitions is storing valid data. In this embodiment, the FIFO control logic is further to access and output the data from the selected one of the first and second storage partitions by accessing and outputting data available at an output of the single-port memory bank of the selected one of the first and second storage partitions in response to determining the prefetch buffer of the selected one of the first and second storage partitions is not storing valid data.

In one embodiment, the FIFO control logic is further to identify the prefetch buffer of the selected one of the first and second storage partitions as storing valid data in response to data being latched into the prefetch buffer responsive to the clock signal. In one embodiment, the FIFO control logic is further to prefetch data from the single-port memory bank of the selected one of the first and second storage partitions by initiating a prefetch of data in a prior clock cycle of the clock signal in response to at least one of: a read access to the selected one of the first and second storage partitions during the prior clock cycle; and a read access or a write access to the other of the first and second storage partitions during the prior clock cycle and the prefetch buffer of the selected one of the first and second partitions not storing valid data during the prior clock cycle.

In one embodiment, the FIFO control logic is further to receive a write access and store data associated with the write access to the selected one of the first and second storage partitions in the same clock cycle. In one embodiment, the FIFO control logic is further to store the data associated with the write access to the prefetch buffer of the selected one of the first and second storage partitions in response to the selected one of the first and second storage partitions being empty. In this case, the FIFO control logic is further to store the data the data associated with the write access to the single-port memory bank of the selected one of the first and second storage partitions.

In accordance with another aspect of the present disclosure, a method is provided. The method includes alternating storage of data from PUSH commands between first and second storage partitions clocked by a clock signal. In this case, the first storage partition includes a first single-port memory bank and a first prefetch buffer, and the second storage partition includes a second single-port memory bank and a second prefetch buffer. The method further includes accessing and outputting data for POP commands from corresponding ones of the first and second storage partitions in the same clock cycles of the clock signal in which the POP commands are received at the FIFO buffer system.

In one embodiment, alternating storage of data from PUSH commands includes receiving a first PUSH command at the FIFO buffer system in a first clock cycle of the clock signal. In this embodiment, alternating storage of data from PUSH commands further includes selecting the first storage partition for processing the first PUSH command based on a write address associated with the first PUSH command. In this embodiment, alternating storage of data from PUSH commands further includes storing first data of the first PUSH command at the first single-port memory bank. In this embodiment, alternating storage of data from PUSH commands further includes receiving a second PUSH command at the FIFO buffer system in a second clock cycle of the clock signal subsequent to the first clock cycle. In this embodiment, alternating storage of data from PUSH commands further includes selecting the second storage partition for processing the second PUSH command based on a write address associated with the second PUSH command. In this embodiment, alternating storage of data from PUSH commands further includes storing second data of the second PUSH command at the second single-port memory bank.

In one embodiment, accessing and outputting data for POP commands includes initiating a prefetch of the first data from the first single-port memory bank to the first prefetch buffer prior to a third clock cycle of the clock signal. In this case, the third clock cycle is subsequent to the first clock cycle. In this embodiment, accessing and outputting data for POP commands further includes receiving a first POP command at the FIFO buffer system in the third clock cycle. In this embodiment, accessing and outputting data for POP commands further includes selecting the first storage partition for processing the first POP command based on a read address associated with the first POP command. In this embodiment, accessing and outputting data for POP commands further includes accessing the first data from the first storage partition for output from the FIFO buffer system in the third clock cycle.

In one embodiment, accessing the first data from the first storage partition for output includes accessing the first data from the first prefetch buffer for output in the third clock cycle in response to determining the first prefetch buffer contains valid data. In this embodiment, accessing the first data from the first storage partition for output further includes accessing the first data from an output of the first single-port memory bank in the third clock cycle in response to determining the first prefetch buffer does not contain valid data.

In one embodiment, the method further includes determining that the first prefetch buffer contains valid data in response to the prefetch of the first data completing before the third clock cycle. In this case, the method further includes determining that the first prefetch buffer does not contain valid data in response to the prefetch of the first data not completing before the third clock cycle. In one embodiment, prefetching the first data includes initiating a prefetch of the first data from the first single-port memory bank during a fourth clock cycle of the clock signal prior to the third clock cycle.

In one embodiment, accessing and outputting data for POP commands further includes receiving a second POP command at the FIFO buffer system in a fourth clock cycle of the clock signal subsequent to the third clock cycle. In this embodiment, accessing and outputting data for POP commands further includes selecting the second storage partition for processing the second POP command based on a read address associated with the second POP command. In this embodiment, accessing and outputting data for POP commands further includes accessing the second data from the second storage partition for output from the FIFO buffer system in the fourth clock cycle. In one embodiment, the method further includes storing the second data to the second prefetch buffer in response to selecting the second storage partition for processing the second PUSH command and in response to determining the second partition is empty. In this case, accessing the second data from the second storage partition includes accessing the second data from the second prefetch buffer for output from the FIFO buffer system in the fourth clock cycle.

In one embodiment, alternating storage of data from PUSH commands between first and second storage partitions includes associating the first storage partition with even addresses and associating the second storage partition with odd addresses. In this embodiment, alternating storage of data from PUSH commands between first and second storage partitions further includes selecting one of the first and second storage partitions for each PUSH command based on whether a write address associated with the PUSH command is an even address or an odd address.

In accordance with another aspect of the present disclosure, a method is provided. The method includes clocking a first-in first-out (FIFO) buffer system with a clock signal. The FIFO buffer system has a first single-port memory bank associated with odd memory addresses and a second single-port memory bank associated with even memory addresses. The method further includes storing first data of a first write access in the first single-port memory bank in a first clock cycle of the clock signal in response to the first write access having an odd write address. The method further includes storing second data of a second write access in the second single-port memory bank in a second clock cycle of the clock signal in response to the second write access having an even write address. The method further includes prefetching the first data from the first single-port memory bank in anticipation of a first read access for the first data. The method further includes receiving the first read access at the FIFO buffer system in a third clock cycle of the clock signal subsequent to the first clock cycle. The method further includes outputting from the FIFO buffer system in the third clock cycle the first data stored at the prefetch buffer in response to receiving the first read access.

In one embodiment, prefetching the first data in anticipation of the first read access includes initiating a prefetch of the first data during a fourth clock cycle subsequent to the first clock cycle and prior to the third clock cycle in response to one of a read access to the first single-port memory bank during the fourth clock cycle or a read access or write access to the second single-port memory bank during the fourth clock cycle.

In this document, relational terms such as "first" and "second", and the like, may be used solely to distinguish one entity or action from another entity or action without necessarily requiring or implying any actual relationship or order between such entities or actions or any actual relationship or order between such entities and claimed elements. The term "another", as used herein, is defined as at least a second or more. The terms "including", "having", or any variation thereof, as used herein, are defined as comprising.

Other embodiments, uses, and advantages of the disclosure will be apparent to those skilled in the art from consideration of the specification and practice of the disclosure disclosed herein. The specification and drawings should be considered as examples only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A first-in first-out (FIFO) buffer system comprising:
 a first storage partition comprising a single-port memory bank having an input to receive a clock signal, the first storage partition associated with a first subset of memory addresses, the first storage partition further comprises a first prefetch buffer having an input to receive the clock signal;
 a second storage partition comprising a single-port memory bank having an input to receive the clock signal, the second storage partition associated with a second subset of memory addresses; and
 FIFO control logic coupled to the first and second storage partitions and having an input to receive the clock signal, in response to a read access for data being received by the FIFO control logic during a clock cycle of the clock signal, the FIFO control logic to access and output the data from the first storage partition in a same clock cycle of the clock signal in which the read access for the data is received and while a write access to the first storage partition is received in the same clock cycle of the clock signal, to determine the first prefetch buffer contains valid data in response to a prefetch of first data completing before the same clock cycle, and to determine the first prefetch buffer does not contain valid data in response to the prefetch of the first data not completing before the same clock cycle, to access and output the data from the first storage partition by accessing and outputting data from the first prefetch buffer in response to determining the first prefetch buffer is storing valid data and by accessing and outputting data available at an output of the single-port memory bank of the first storage partition in response to determining the first prefetch buffer is not storing valid data.

2. The FIFO buffer system of claim 1, wherein the FIFO control logic is configured to select a selected one of the first and second storage partitions based on an alternating of read accesses between the first storage partition and the second storage partition.

3. The FIFO buffer system of claim 2, wherein:
 the first subset of memory addresses is even memory addresses and the second subset of memory addresses is odd memory addresses; and
 the FIFO buffer system is to select the selected one of the first and second storage partitions based on whether a read address for the read access is an even address or an odd address.

4. The FIFO buffer system of claim 1, wherein:
 the second storage partition further comprises a second prefetch buffer having an input to receive the clock signal; and
 the FIFO control logic is to prefetch data from the single-port memory bank of the first storage partition to the first prefetch buffer of the first storage partition and to prefetch data from the single-port memory bank of the second storage partition to the second prefetch buffer of the second storage partition.

5. The FIFO buffer system of claim 4, wherein the FIFO control logic is configured to prefetch data from the single-port memory bank of the selected one of the first and second storage partitions by initiating a prefetch of data in a prior clock cycle of the clock signal in response to at least one of: a read access to the selected one of the first and second storage partitions during the prior clock cycle; and a read access or a write access to the other of the first and second storage partitions during the prior clock cycle and the prefetch buffer of the selected one of the first and second partitions not storing valid data during the prior clock cycle.

6. The FIFO buffer system of claim 4, wherein the FIFO control logic is configured to receive a write access and store data associated with the write access to the selected one of the first and second storage partitions in the same clock cycle.

7. The FIFO buffer system of claim 6, wherein the FIFO control logic is configured to store the data associated with the write access to the prefetch buffer of the selected one of the first and second storage partitions in response to the selected one of the first and second storage partitions being empty and to store the data associated with the write access to the single-port memory bank of the selected one of the first and second storage partitions.

8. In a first-in first-out (FIFO) buffer system, a method comprising:
  alternating storage of data from PUSH commands between first and second storage partitions clocked by a clock signal, the first storage partition comprising a first single-port memory bank and a first prefetch buffer and the second storage partition comprising a second single-port memory bank and a second prefetch buffer; and
  accessing and outputting data for a first POP command from one of the first and second storage partitions in the same clock cycle of the clock signal in which the first POP command is received at the FIFO buffer system while a first PUSH command corresponding to the one of the first and second storage partitions is received in the same clock cycle of the clock signal;
  determining the first prefetch buffer contains valid data in response to a prefetch of first data completing before the same clock cycle; and
  determining the first prefetch buffer does not contain valid data in response to the prefetch of the first data not completing before the same clock cycle, wherein accessing the first data from the first storage partition for output comprises:
    accessing the first data from the first prefetch buffer for output in the third clock cycle in response to determining the first prefetch buffer contains valid data; and
    accessing the first data from an output of the first single-port memory bank in the third clock cycle in response to determining the first prefetch buffer does not contain valid data.

9. The method of claim 8, wherein alternating storage of data from PUSH commands comprises:
  receiving the first PUSH command at the FIFO buffer system in a first clock cycle of the clock signal;
  selecting the first storage partition for processing the first PUSH command based on a write address associated with the first PUSH command;
  storing first data of the first PUSH command at the first single-port memory bank;
  receiving a second PUSH command at the FIFO buffer system in a second clock cycle of the clock signal subsequent to the first clock cycle;
  selecting the second storage partition for processing the second PUSH command based on a write address associated with the second PUSH command; and
  storing second data of the second PUSH command at the second single-port memory bank.

10. The method of claim 9, wherein accessing and outputting data for POP commands comprises:
  initiating the prefetch of the first data from the first single-port memory bank to the first prefetch buffer prior to a third clock cycle of the clock signal, the third clock cycle subsequent to the first clock cycle;
  receiving the first POP command at the FIFO buffer system in the third clock cycle;
  selecting the first storage partition for processing the first POP command based on a read address associated with the first POP command; and
  accessing the first data from the first storage partition for output from the FIFO buffer system in the third clock cycle.

11. The method of claim 8, wherein prefetching the first data comprises:
  initiating the prefetch of the first data from the first single-port memory bank during a fourth clock cycle of the clock signal prior to the third clock cycle.

12. The method of claim 10, wherein accessing and outputting data for POP commands further comprises:
  receiving a second POP command at the FIFO buffer system in a fourth clock cycle of the clock signal subsequent to the third clock cycle;
  selecting the second storage partition for processing the second POP command based on a read address associated with the second POP command; and
  accessing the second data from the second storage partition for output from the FIFO buffer system in the fourth clock cycle.

13. The method of claim 12, further comprising:
  storing the second data to the second prefetch buffer in response to selecting the second storage partition for processing the second PUSH command and in response to determining the second partition is empty; and
  wherein accessing the second data from the second storage partition comprises accessing the second data from the second prefetch buffer for output from the FIFO buffer system in the fourth clock cycle.

14. The method of claim 8, wherein alternating storage of data from PUSH commands between first and second storage partitions comprises:
  associating the first storage partition with even addresses and associating the second storage partition with odd addresses; and
  selecting one of the first and second storage partitions for each PUSH command based on whether a write address associated with the PUSH command is an even address or an odd address.

15. A method comprising:
  clocking a first-in first-out (FIFO) buffer system with a clock signal, the FIFO buffer system having a first single-port memory bank associated with odd memory addresses and a second single-port memory bank associated with even memory addresses;
  storing first data of a first write access in the first single-port memory bank in a first clock cycle of the clock signal in response to the first write access having an odd write address;
  storing second data of a second write access in the second single-port memory bank in a second clock cycle of the clock signal in response to the second write access having an even write address;
  prefetching the first data from the first single-port memory bank in anticipation of a first read access for the first data;
  receiving the first read access at the FIFO buffer system in a third clock cycle of the clock signal subsequent to the first clock cycle;
  receiving a second write access in the first single-port memory bank in the third clock cycle of the clock signal;

determining the first prefetch buffer contains valid data in response to a prefetch of first data completing before the same clock cycle;

determining the first prefetch buffer does not contain valid data in response to the prefetch of the first data not completing before the same clock cycle, wherein accessing the first data from the first storage partition for output comprises:

accessing the first data from the first prefetch buffer for output in the third clock cycle in response to determining the first prefetch buffer contains valid data; and accessing the first data from an output of the first single-port memory bank in the third clock cycle in response to determining the first prefetch buffer does not contain valid data; and outputting from the FIFO buffer system in the third clock cycle the first data stored at the prefetch buffer in response to receiving the first read access.

16. The method of claim 15, wherein prefetching the first data in anticipation of the first read access comprises initiating a prefetch of the first data during a fourth clock cycle subsequent to the first clock cycle and prior to the third clock cycle in response to one of a read access to the first single-port memory bank during the fourth clock cycle or a read access or write access to the second single-port memory bank during the fourth clock cycle.

\* \* \* \* \*